US 7,536,641 B2

(12) United States Patent
Rosenstein et al.

(10) Patent No.: US 7,536,641 B2
(45) Date of Patent: May 19, 2009

(54) WEB PAGE AUTHORING TOOL FOR STRUCTURED DOCUMENTS

(75) Inventors: Justin M. Rosenstein, Oakland, CA (US); Dana A. Levine, San Francisco, CA (US); Ojan Vafai, San Francisco, CA (US); Aaron Boodman, San Francisco, CA (US); Lilly Christine Irani, San Francisco, CA (US); David Jeske, San Francisco, CA (US)

(73) Assignee: Google Inc., Mountain View, CA (US)

( * ) Notice: Subject to any disclaimer, the term of this patent is extended or adjusted under 35 U.S.C. 154(b) by 417 days.

(21) Appl. No.: 11/118,045

(22) Filed: Apr. 29, 2005

(65) Prior Publication Data
US 2006/0248442 A1 Nov. 2, 2006

(51) Int. Cl.
G06F 15/00 (2006.01)
G06F 17/00 (2006.01)
(52) U.S. Cl. .................. 715/234; 715/223; 715/253; 715/751; 715/752; 715/759; 709/205
(58) Field of Classification Search ................ 715/500, 715/501.1, 513, 751, 752, 759; 709/205
See application file for complete search history.

(56) References Cited

U.S. PATENT DOCUMENTS

| 2003/0135765 A1* | 7/2003 | Hind et al. .................. 713/202 |
| 2003/0233425 A1* | 12/2003 | Lyons et al. ................ 709/217 |
| 2004/0044650 A1* | 3/2004 | Bova ............................ 707/1 |
| 2004/0243930 A1* | 12/2004 | Schowtka et al. ........... 715/513 |
| 2005/0246283 A1* | 11/2005 | Gwiazda et al. .............. 705/52 |
| 2006/0004703 A1* | 1/2006 | Spivack et al. ................. 707/2 |
| 2006/0053194 A1* | 3/2006 | Schneider et al. ........... 709/204 |
| 2006/0123127 A1* | 6/2006 | Littlefield ................... 709/229 |
| 2006/0235984 A1* | 10/2006 | Kraus et al. ................. 709/228 |

OTHER PUBLICATIONS

Pelletier, Michel, ZWiki Online Collaboration Tool, Mar. 28, 2002, ZopeMag.com, Product Review, pp. 1-2.*
"Homestead Quicksites," Demo@15!, Scottsdale, Arizona, Feb. 13-15, 2005, 2 pages.
Trellix: Comprehensive Private-label Web Site Solutions, http://www.trellix.com/products/sitebuilding.asp, 2003, 7 pages.

(Continued)

Primary Examiner—Doug Hutton
Assistant Examiner—Nathan Hillery
(74) Attorney, Agent, or Firm—Morgan, Lewis & Bockius LLP

(57) ABSTRACT

A web page is composed using a browser that displays an authoring web page containing an authoring tool embedded in the authoring web page. The authoring web page, as displayed in a browser window, includes a web page editing region that displays a web page under construction. The web page editing region further includes one or more user-specified instances of structured fields, each instance responsible for hosting content entered directly by the web page author through the browser window or identified by the web page authoring using the authoring tool. A composed web page is published, for example on the Internet. Thereafter, the composed web page can be rendered in a browser window of any client computer or device in a style consistent with the user-entered content in the web page editing region.

30 Claims, 14 Drawing Sheets

OTHER PUBLICATIONS

"Bigstep: Test Drive Bigstep," http://go.bigstep.com/tour.htm, 2002, 9 pages.

"Website.Machine—Browser Based Software," http://www.websitemachine.com/index.asp?cat=overview, 2004, 3 pages.

"TypePad Personal Weblogging Service," http://www.sixapart.com/typead/, 2003, 3 pages.

Perez, J.C., "Macromedia Introduces Publishing Tool for EBay—Special Version of Contibute Web software will simplify creation of EBay stores," PC World.com, http://www.pcworld.com/resource/printable/article/0,aid,118422,00.asp, Nov. 1, 2004, 2 pages.

"Product Showcase—Sitemaker," http://websiteanimal.com/wsa/productShowcaseShitemaker.jsp, 2 pages, 2004.

"Drupal.org—Community Plumbing: Drupal 4.6.3 / 4.5.5 released," http://drupal.org, 6 pages, Oct. 2005.

"Homestead SiteBuilder LXP, Feature Review—New and Improved Functionality," http://csta-us.org/~site/Documents/lpx_product_review.pdf, 3 pages, 2005.

"Trellix: Comprehensive Private-label Web Site Solutions," http://www.trellix.com/products/sitebuilding.asp, 2003, 7 pages.

"Yahoo! PageWizards," http://geocities.yahho.com/y/w/, Apr. 2005, 2 pages.

"Yahoo! SiteBuilder," http://webhosting.yahoo.com/ps/sb/index.php, 2005, 2 pages.

"Website Builder for Website Building—Moonfruit Sitemaker," http://www.moonfruit.com, 2005, 6 pages.

"UserLand ManilaSites—Introduction and User Guide," http://www.manilasites.com, 2005, 108 pages.

"TypePad Personal Weblogging Service," http://www.sixapart.com/typead/, 2003, 3 pages.

"WordPress—Free Blog Tool and Weblog Platform and Features," http://wordpress.org, 2005, 4 pages.

"Blogger: Create your Blog," http://www.blogger.com/start, 2005, 6 pages.

"Ephox EditLive! for Java 5.0—Highlights, What's New & Business User Productivity," http://www.ephox.com/product/editliveforjava/, 1999-2005, 12 pages.

"TWiki—an Enterprise Collaboration Platform," http;//www.twiki.org, 5 pages, 2005.

"Squarespace—What is Squarespace?" http://www.squarespace.com, 2003-2005, 11 pages.

"Jotspot—The Application Wiki, Intro and Advanced Tours," http://www.jot.com/index.php, 2004-2005, 26 pages.

"Flexwiki—User Guide," http://www.flexwiki.com/default.aspx/FlexWiki/UserGuide.html, Sep. 2005, 2 pages.

"EditMe—Edit Your Web and Features," http://editime.com, 2003-2005, 6 pages.

"Confluence—the Enterprise Wiki and Features tour" http://www.altassian.com/software/confluence/, 2005, 51 pages.

* cited by examiner

WEB PAGE AUTHORING TOOL FOR STRUCTURED DOCUMENTS

FIELD OF THE INVENTION

The present invention relates generally to the field of web page development and management systems, and in particular, to a web page authoring tool that enables a web page author to compose a web page in a visually intuitive manner.

BACKGROUND

Internet provides a convenient channel for people to retrieve information. Through a browser window, an Internet user can easily access any one of the billions of web pages published on the Internet. Most web pages are written in a special computer language called "hypertext markup language" (HTML). However, a user must be very familiar with the HTML syntax in order to compose a web page having a desired look-and-feel. A typical unpleasant experience a web page author has with preparing an HTML file is that the HTML file, when rendered by a web browser, appears very differently from what the author expected. The web page author may spend many hours to debug and revise the HTML file so that when the HTML file is rendered by a web browser, it presents information or other content in the manner intended by the web page author.

BRIEF DESCRIPTION OF THE DRAWINGS

The aforementioned aspects of the invention as well as additional aspects will be more clearly understood as a result of the following detailed description of the various embodiments of the invention when taken in conjunction with the drawings. Like reference numerals refer to corresponding parts throughout the several views of the drawings.

DESCRIPTION OF EMBODIMENTS

A first aspect of the present invention is directed to a method for composing a web page through a web browser in a visually intuitive manner. According to some embodiments of the method, a browser window is displayed to a web page author on a computer monitor. The browser window includes a web page editing region that displays a web page under construction. The web page editing region further includes one or more user-specified instances of structured fields, each instance responsible for hosting a portion of the web page content entered directly by the web page author through the browser window and I/O devices. Once published (e.g., on the Internet or an intranet), the web page can be displayed in a browser window in a style consistent with the user-entered content in the web page editing region.

A second aspect of the present invention is directed to a web page authoring tool, that supports visually intuitive web page authoring and editing. The web page authoring tool is embedded in a web page suitable for rending by a browser, and includes a website manager, a web page manager, and a web page editor. The web page editor includes a plurality of modules enabling a web page author to compose a web page directly through a web browser window in a what-you-see-is-what-you-get (WYSIWYG) manner.

A third aspect of the present invention is directed to a client-server based web page development and management system. A client computer includes a web page having an embedded authoring tool that enables a web page author to compose a web page directly through a browser window in a WYSIWYG manner. The server computer breaks a composed web page into a set of (key, value) pairs and an associated web template, which are stored in a database accessible to the server computer. In response to a request for the web page, the server computer generates an HTML file using the (key, value) pairs and the web template and transmits the HTML file to a requesting client computer to render a web page that has a look-and-feel substantially similar to that of the web page composed on a client computer.

Figure 1:
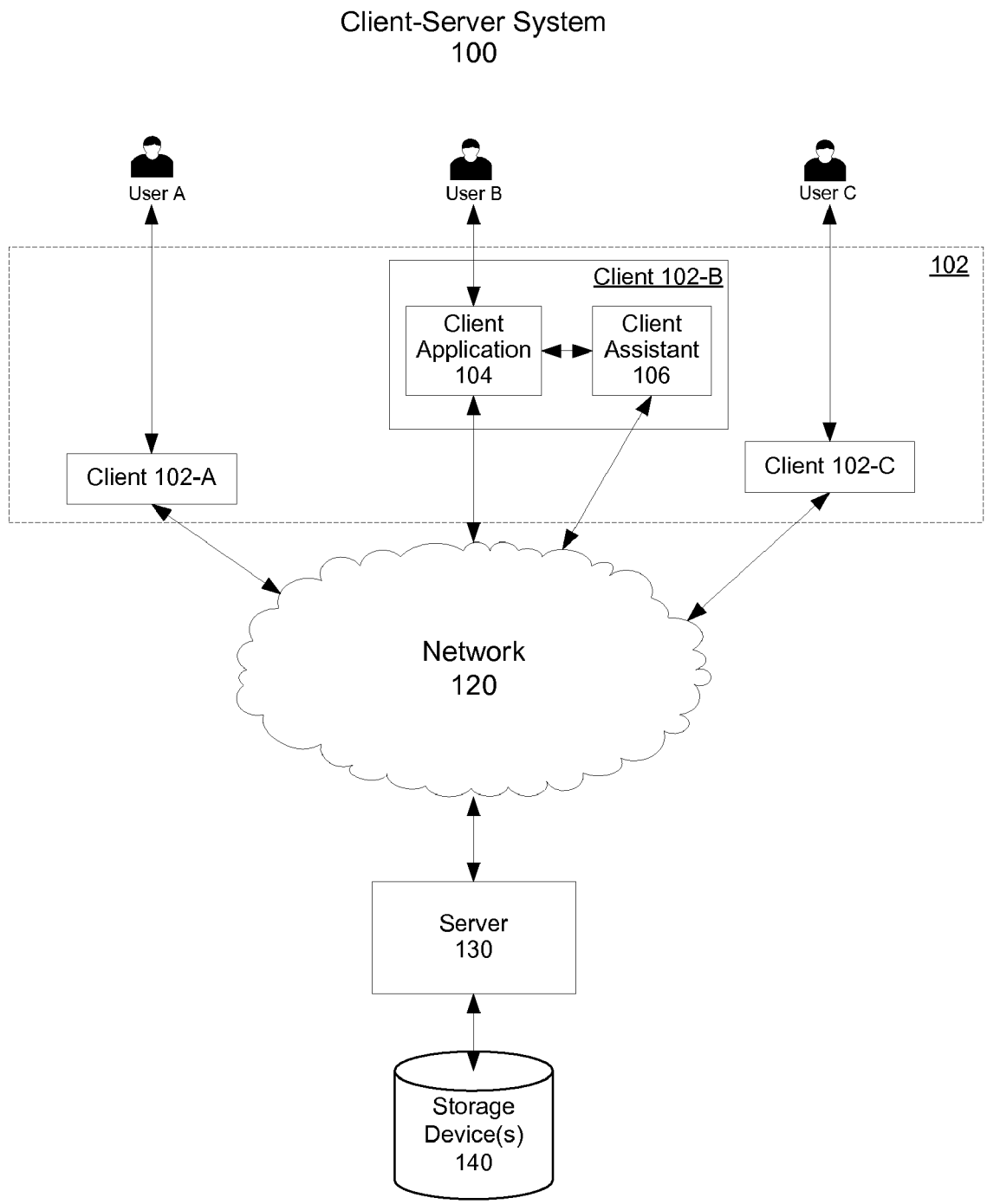
FIG. 1 is a block diagram illustrating a client-server system in accordance with some embodiments of the present invention.

FIG. 1 is a block diagram illustrating a client-server system 100 according to some embodiments of the present invention. The system 100 includes a plurality of clients 102 (e.g. 102-A, 102-B, 102-C) connected to a server 130 through a network 120. The network 120 may be the Internet, other wide area networks, local area networks, metropolitan area networks, wireless networks, etc., or any combination of such communication networks.

In some embodiments, a client (sometimes referred to as a client device) 102 hosts at least a client application 104 and a client assistant 106. The client 102 may be a personal digital assistant (PDA), a personal computer (PC), a workstation that has a displaying device or any other suitable client device. The client application 104 may be a web browser (e.g., Firefox™, Safari™, Internet Explorer™, or others) or a standalone browser or program that displays a structured document such as a web page. The client assistant 106 may be embedded in one or more web pages downloaded to the client 102 from a remote server. The client assistant 106 can include JavaScript instructions embedded in the one or more web pages, and those JavaScript instructions can be executed by the client 102 in an environment (e.g., a virtual machine environment or program interpreter) provided by the client application 104. With the help of the client assistant 106, a web page author is able to edit the web page directly through a browser window in a what-you-see-is-what-you-get (WYSIWYG) manner.

It is noted that a web page is any document designed for viewing in a browser, such as a web browser, regardless of whether the document is accessed via the Internet, an intranet, or other mechanism. A "window" or "browser window" comprises a virtual graphical display area for viewing a web page, HTML file, XML file or the like. A "window" typically corresponds to a "tab" or "window" or the like in various browser programs.

Changes made by the web page author (e.g., a user of the client 102) are, periodically or upon request, transmitted to the server 130 and stored in one or more storage devices 140 (e.g., a database) that are accessible to the server 130. In some embodiments, a web page is not stored in the form of an HTML file on the server 130, except when the server is preparing the web page for distribution to a client 102. Instead, the web page is decomposed into multiple (key, value) pairs, each key identifying a structured field in the web page and each value corresponding to the web page content in the structured field. The web page has an associated web template that includes information defining the look-and-feel of the web page.

Upon receipt of a request for a particular web page by a user from one of the clients 102, the server 130 identifies a corresponding set of (key, value) pairs and a web template associated with the web page in the storage devices 140. The server 130 dynamically generates an HTML file using the identified information and returns the HTML file to the requesting client 102.

On the client side, the HTML file is rendered into a web page in a web browser window (or more generally, a window of the client application 104). In some embodiments, a copy of the client assistant 106 is transmitted to the requesting client if the requesting user is an authorized user and submits a request to edit the web page. In particular, the client assistant 106 may be embedded in a web page received by the client 102 in response to the user's request to edit a specified web page, or to begin authoring a new web page. The client assistant works in concert with the web browser to provide the user a visually intuitive editing experience. If the user is not an authorized user, or if the user does not intend to update the web page, the HTML file is rendered by the web browser in a read-only fashion. No client assistant is involved in the rendering of the HTML file. In some embodiments, the client assistant 106, or portions of the client assistant, may be persistently stored at the client 102. In some embodiments, various portions or subsets of the client assistant 106 may be embedded in different web pages, or the client assistant 106 may include instructions for requesting and downloading additional portions of the client assistant as needed while the user accesses various web page composing and editing tools within the client assistant.

Figure 2A:
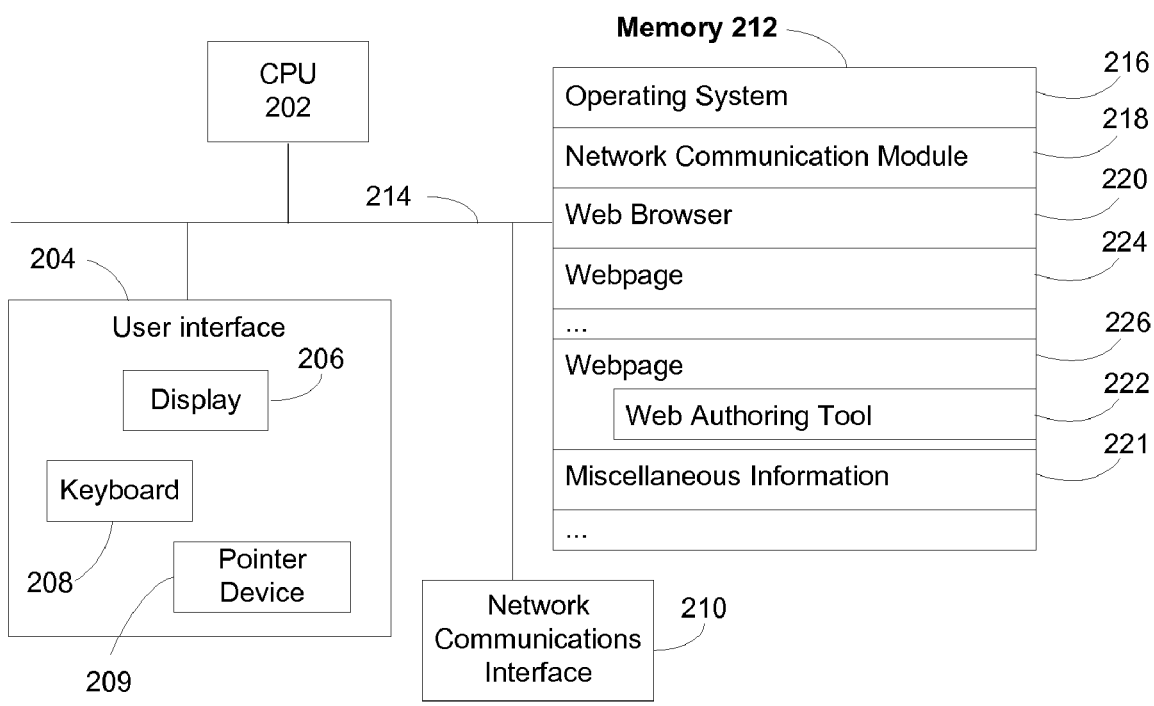
FIG. 2A is a block diagram of a client computer in accordance with some embodiments of the present invention.

FIG. 2A is a block diagram illustrating a client computer 200 in accordance with some embodiments of the present invention. The client computer 200 typically includes one or more processing units (CPUs) 202, one or more network or other communications interfaces 210, memory 212, and one or more communication buses 214 for interconnecting these components. The client computer 200 also includes a user interface 204 that comprises a display device 206, a keyboard 208, and optionally a pointer device 209, e.g., a mouse. The memory 212 includes high speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 212 may optionally include one or more storage devices remotely located from the CPUs 202. In some embodiments, the memory 212 stores the following elements, modules and data structures, or a subset or superset thereof:

- an operating system 216 that includes procedures for handling various basic system services and for performing hardware dependent tasks;
- a network communication module (or instructions) 218 for connecting the client computer 200 to other computers via the one or more network communications interfaces 210 (through wired or wireless connections), using the Internet, other wide area networks, local area networks, metropolitan area networks, or the like;
- a web browser module (or instructions) 220 for downloading one or more user-requested HTML files 224, 226, from a remote location and rendering the HTML file into a web page on the display device 206 of the client computer 200;
- a web-page authoring tool (or instructions) 222 for receiving user inputs through a browser window and updating a web page in the browser window in response to the user inputs; the web-page authoring tool 222 may be embedded in an authoring web page (HTML file) 226 received from a remote server; and
- miscellaneous information 221 including the web page displayed in the browser window and its associated HTML file, user inputs in the browser window, identifier(s) identifying an ongoing composing session between the client computer and a remote server computer, etc.

With the support of the web page authoring tool 222, a web page author can directly compose a web page through a browser window using the I/O devices. According to some embodiments, the web page authoring tool 222 is a software package written in Javascript™ (a trademark of Sun Microsystems, Inc.) or ECMAScript (the specification for which is published by the European Computer Manufacturers Association International). The package includes multiple modules, each module responsible for accomplishing one or more designated tasks related to the construction of the web page.

Figure 2B:
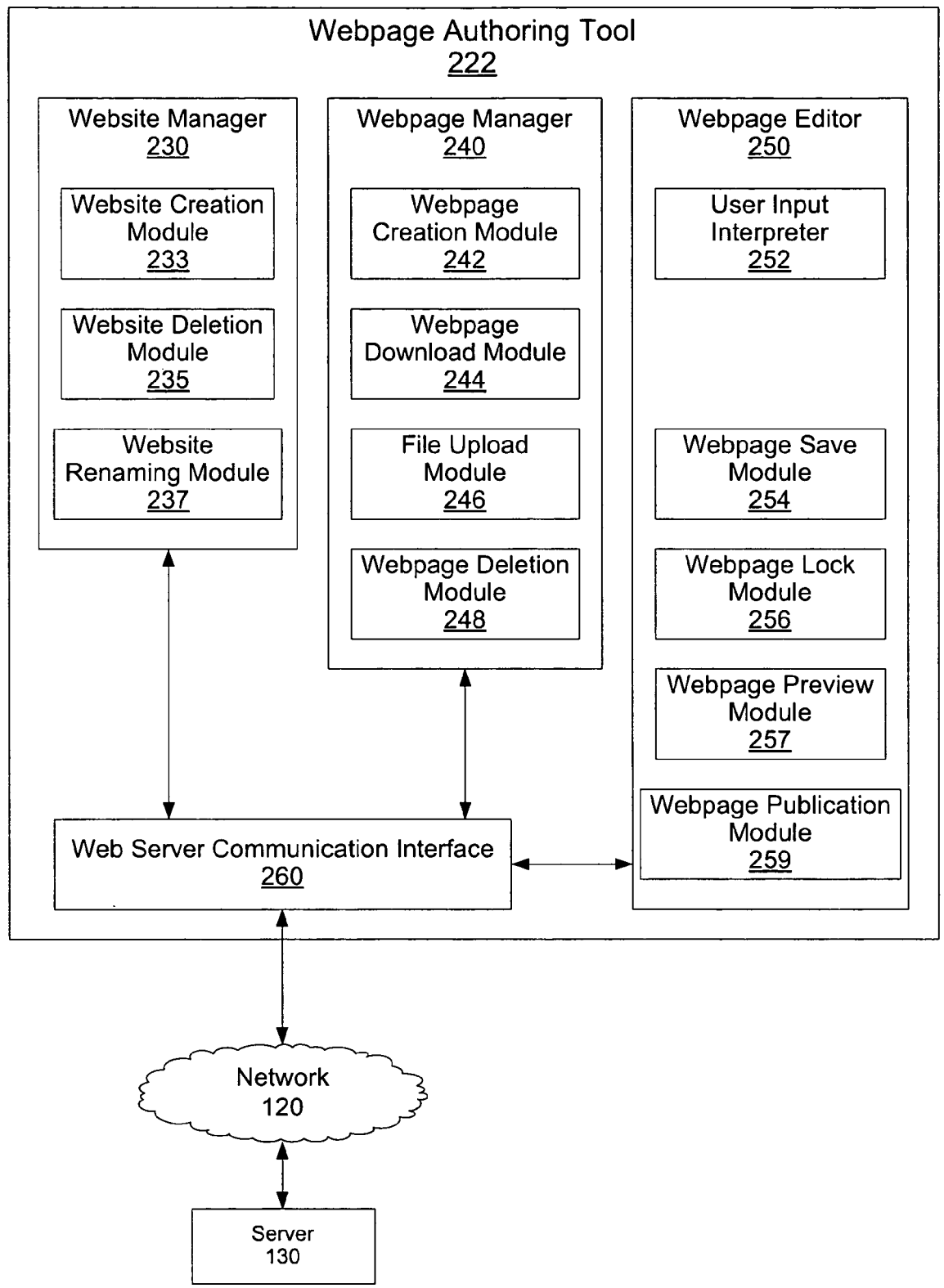
FIG. 2B is a block diagram illustrating a detailed structure of a web page authoring tool according to some embodiments of the present invention.

FIG. 2B is a block diagram illustrating a detailed structure of the web page authoring tool 222 according to some embodiments of the present invention. Based on their respective responsibilities, the modules are partitioned into four groups:

- Website Manager 230—The website manager performs multiple website-specific operations and includes modules like:
  - Website Creation Module 233—The website creation module prompts a user to enter a website title and a website name. The website title characterizes information hosted by the website. The website name typically contains a unique string of alphanumeric characters. In some embodiments, the website manager suggests a website name based on the user-provided website title.
  - Website Deletion Module 235—The website deletion module prompts a user to confirm whether he would like to remove a website and its associated web pages and resources from the server computer's database. In some embodiments, a deleted website cannot be recovered.
  - Website Renaming Module 237—The website renaming module allows a website's administrator(s) to give the website a new name and updates the website's record in the database accordingly.
- Web page manager 240—The web page manager performs multiple web page-specific operations and includes modules like:
  - Web page Creation Module 242—The web page creation module prompts a user to enter a web page title and, optionally, a universal resource locator (URL) for a new web page. The web page title serves as an identifier for the web page in the website manager and in the title bar of a browser window. The URL serves as the address of the web page after its publication. If the user's does not enter a URL, a URL is automatically generated for the web page. In addition, the user may change the automatically generated URL to an appropriate website, Internet or Intranet location.

Web page Download Module 244—The web page download module retrieves a user-requested web page from the server computer and passes it to the web page editor, which displays the web page in a browser window and makes certain regions in the web page editable.

File upload module 246—The file upload module prompts a user to enter the address of a file (e.g., an image), verifies that the file has a unique name, and uploads the file to the server computer.

Web page Deletion Module 248—The web page deletion module deletes a user-specified web page from a website in the server computer. The web page, if not yet published, is deleted. In some embodiments, if the web page has been published, it is deleted when the website is re-published according to a predetermined schedule, while in other embodiments, the web page is deleted from the website immediately.

Web page editor 250—The web page editor is primarily responsible for creating a WYSIWYG-style editing environment and includes modules like user input interpreter 252, editing tools module 253, web page save module 254, web page lock module 256, web page preview module 257, and web page publication module 259, etc. In some embodiments, the WYSIWYG-style editing environment provided by the web page editor is an "in-place" WYSIWYG-style editing environment that enables the user to see the content he or she is entering or changing in the context of the complete composed web page. A more detailed discussion about the web page editor and its modules is provided below in connection with FIGS. 3A-3I.

Web Server Communication Interface 260—The web server communication interface communicates with a server computer in response to various requests from the website manager, the web page manager, and the web page editor.

To appreciate how a web page author composes a web page through a browser window in a WYSIWYG manner, let us look at a hypothetical example. Suppose that there is a cafeteria on a university's campus and the cafeteria's name is "Campus Café". The cafeteria owner updates its menu on a weekly basis. In the past, the owner posted a new weekly menu for the coming week on the front door of the cafeteria every Monday morning. A downside with this advertising strategy is that few people can or will memorize the menu for a week. Therefore, the owner decides to publish the menu on the Internet so that anyone can easily tell what will be served on a particular day by visiting the on-line menu. The owner knows how to use a web browser and has in his mind a rough picture about what the on-line menu should look like. But the owner has no experience with the HTML language. Nor does he have any knowledge about the infrastructure of the Internet.

Assuming that the owner has created a website for the cafeteria, FIGS. 3A-3I are a set of schematic screenshots illustrating how the cafeteria owner, step by step, composes the on-line menu through a browser window in a WYSIWYG manner.

Figure 3A:
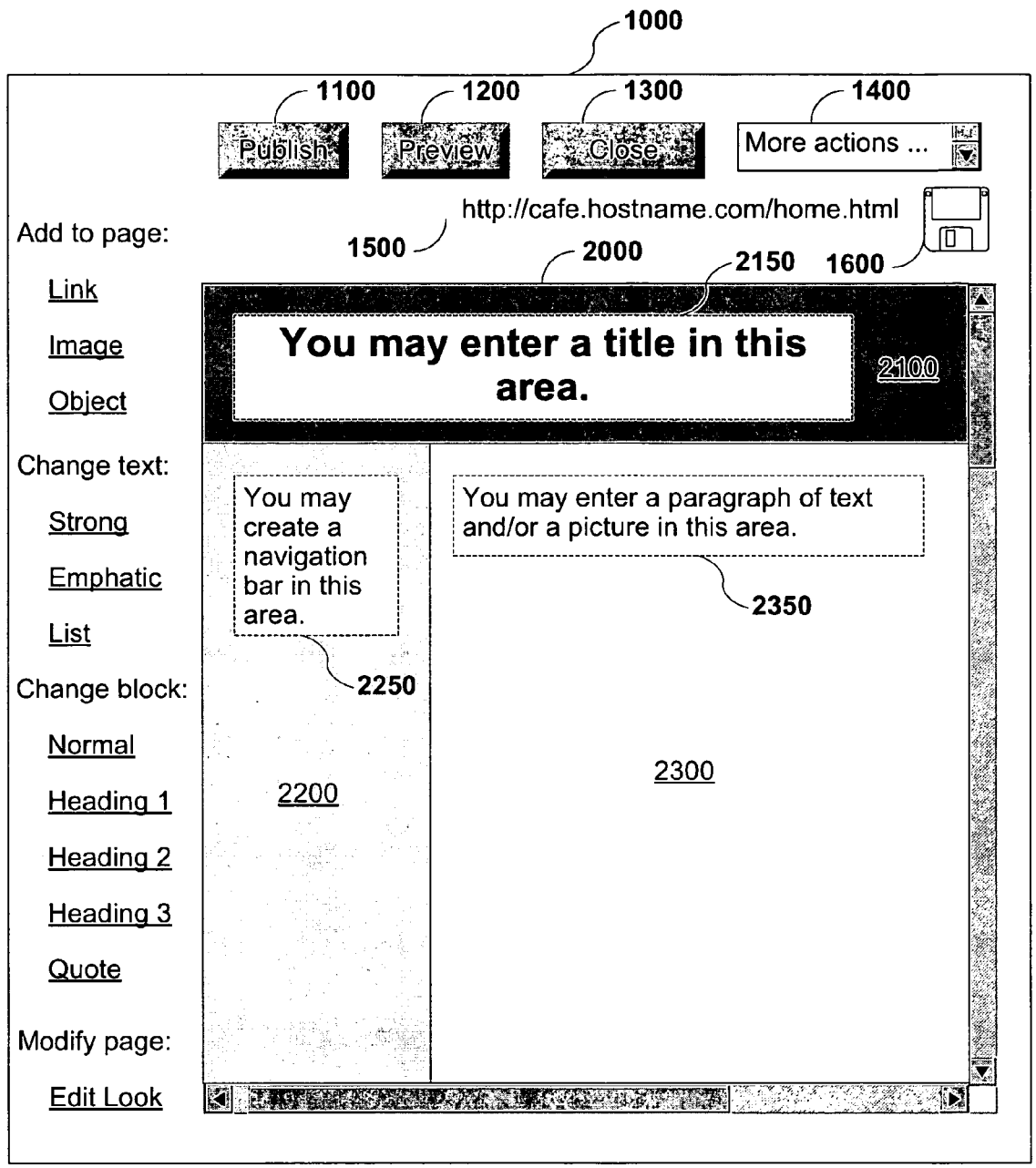
FIGS. 3A-3I are a set of schematic screenshots illustrating how a web page author composes a web page through a browser window using a web page editor in a WYSIWYG manner.

Referring to FIG. 3A, an authoring web page, displayed in a browser window 1000, includes a web page editing region 2000. The web page editing region 2000 displays a replica of the composed web page, which may be incorporated into the authoring web page through the use of an "Iframe" that contains a URL associated with a server 130. The URL in the Iframe is used to download from the server HTML corresponding to the composed web page. In other embodiments, the authoring tool or other program on the client may compose the replica, in which case the Iframe in the authoring page would contain a URI or URL that points to a locally generated HTML file or object corresponding to the composed web page.

The web page editing region 2000 includes three content areas 2100, 2200 and 2300, each content area including one or more editing fields. In some embodiments, one or more of the editing fields has a predefined heuristic instruction. The instruction suggests what type of web page content is recommended for a particular structured field. For example, the content area 2100 includes a title editing field 2150, which provides an instruction "You may enter a title in this area" presented in a large font style typically used by a web page's title.

Above the web page editing region 2000 are several web page editing controls. For example, if the cafeteria owner finishes composing the web page, he may click the "Publish" button 1100 to submit a publication request to the web page publication module of the web page editor. The web page publication module transmits the published web page to the server computer. The server computer, in response, updates its database components corresponding to the web page. In this example, the server computer makes the newly published on-line menu available to any subsequent user who visits the cyberspace address 1500, http://cafe.hostname.com/home-.html, using any suitable browser or similar application. A more detailed discussion about the server-side operations is provided below in connection with FIG. 4.

Every now and then, the owner may pause for a moment and take a brief look at the web page under construction to evaluate if it will have a desired look-and-feel once published. To do so, the owner clicks the "Preview" button 1200. The web page preview module, in response, brings up a preview browser window on the client, displaying the web page in almost exactly the same fashion as if it is published. It is noted that the composed web page replica displayed within the authoring web page also looks very similar to the published web page.

In some embodiments, there may be several minor differences between a published web page and a previewed web page. For example, the previewed web page may include a visual indicator, e.g., an icon or a blinking web page title, indicating that the web page has not been formally published on the Internet. Any user who visits the URL of the web page still encounters the previously published web page, if any, but not the one displayed in the preview browser window. Moreover, according to some embodiments, previewing a web page does not request assistance from the server computer. The web page preview module located on the client computer triggers the preview browser window. The HTML file rendered in the preview browser window is the same copy rendered in the web page editing region 2000.

If the owner decides to close the web page editing region 2000 without publishing the web page, he may click the "Close" button 1300. In response, the web page editor closes the browser window 1000, or alternately it replaces the current web page with a "clean" version of the authoring web page that can be used to compose a new web page or to open and revise a user selected web page. In some embodiments, the web page save module sends a save request including the latest version of the web page to the server computer. The server computer then saves the latest version in its database. Next time, when the cafeteria owner is ready to resume editing the composed web page, he may re-open the authoring web page, including the current version of the composed web page, by clicking a hyperlink to the web page in a browser window. The new browser window also contains a web page editing region receiving user inputs with respect to the web page.

In some embodiments, the web page save module periodically, e.g., every few seconds, transmits the latest version of the web page to the server computer to avoid losing any user input. A floppy disk icon 1600 in the browser window 1000, through switching its look between two modes (compare FIGS. 3A and 3B), indicates whether the latest user input has been saved into the server-side database. To transmit the latest version, the web page save module may transmit to the server computer data representing the difference between the current version of the web page and a prior version (e.g., the most recent version saved by the server computer). The size of the update depends on the amount of new user input during the time interval.

Since the communication protocol between a web browser and a web server is stateless, periodic contact between the client computer and the server computer is desired to avoid simultaneous editing efforts from multiple users. This is especially true in the event that the creator of a web page may grant multiple users the right to edit the web page. Therefore, a periodic update initiated by the web page save module serves as a signal to the server computer that there is an ongoing composing session associated with the web page.

Alternatively, while one user edits a web page through one client computer, the web page lock module on the client computer periodically pings back to the server computer, indicating that the web page is still being edited, and prohibits other users from editing it. When a second user attempts to edit the web page by, e.g., clicking a hyperlink to the web page, a message appears on his or her computer monitor suggesting that the web page is currently locked by another user and he or she cannot access the web page.

In some embodiments, the server computer allows the second user to break the lock set up by the first user. This mechanism is necessary when a user attempts to edit the web page from one client computer after he forgets to release the web page from another computer which was opened previously. In this scenario, the server computer sends an email message to the user whose lock is broken, the message attaching a copy of the final version of the web page composed by the user so that his work will not be lost.

To the left of the web page editing region 2000 are a few illustrative tools supported by the editing tools module. The cafeteria owner can use them to enrich the content and style of the web page under construction. For example, the owner may upload an image into the web page editing region 2000 and create a table listing each day's menu items. If the owner is not satisfied with the web page's current look-and-feel, he may click the "Edit Look" link and associate the web page with a different web template. As a result, the web page in the web page editing region 2000 is re-rendered in accordance with the newly chosen web template. Each web template may associate particular colors, border styles, text styles and the like with each web page region of the web template, and these styles and other characteristics are applied to the structured fields in the respective regions of the web page being composed. The use of fielded editing and logical styles facilitates the transformation between templates.

Figure 3B:
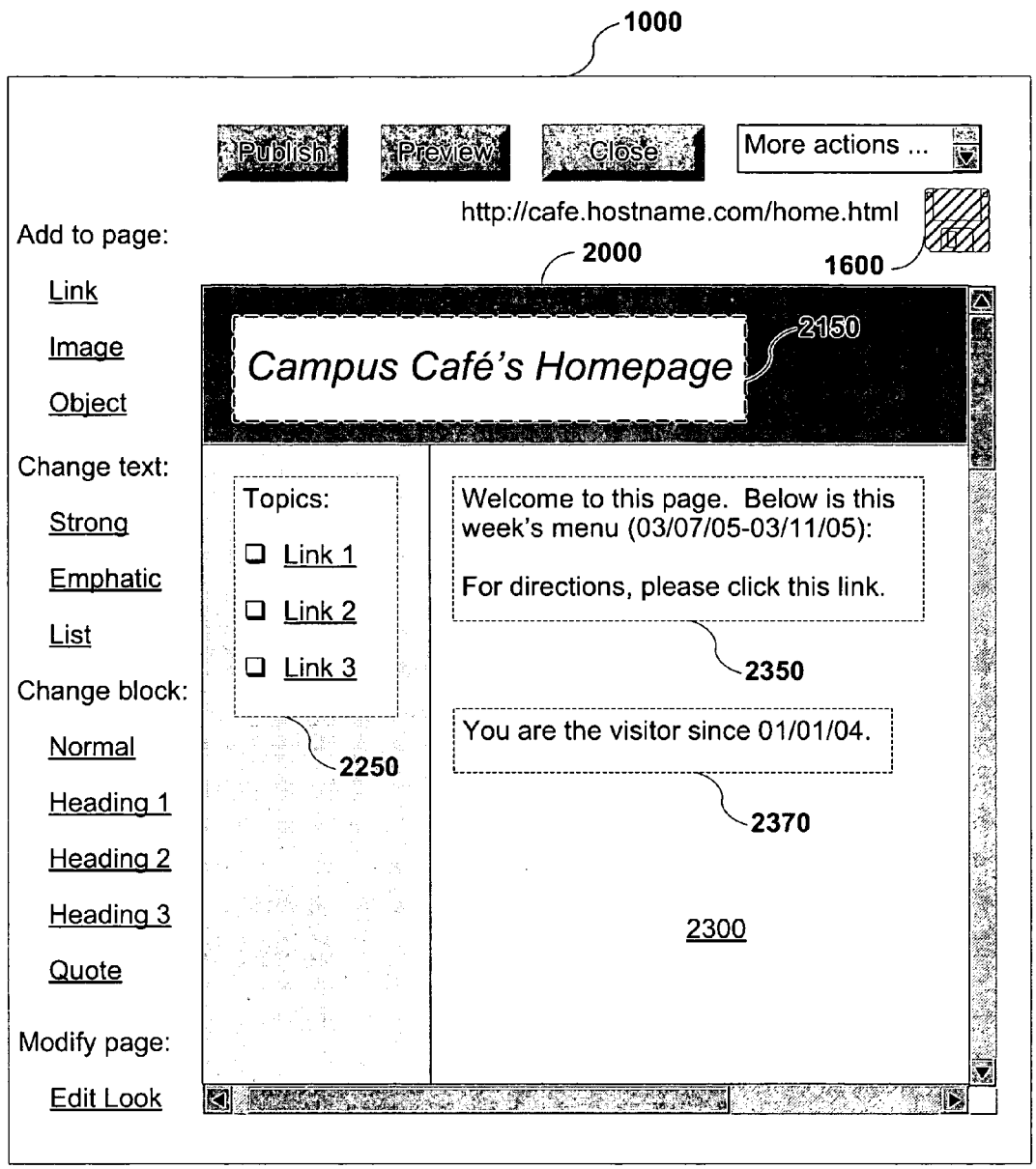

FIG. 3B is a screenshot of the on-line menu after the owner enters certain textual input into different structured fields. In the title editing field 2150, the owner enters the title of the web page, "Campus Café's Homepage". Note that the owner sets the font style of the title to be italic, different from that of the original heuristic instruction in the field. In other words, a web page author does not have to abide by the heuristic instruction. He can decide the style of the web page arbitrarily to his like. In the navigation bar editing field 2250, the owner creates a set of navigational links, each link referencing a different web page or website that is presumably of interest to a visitor to the on-line menu. For example, one of the links may point to the website of the university's newspaper. A visitor to the on-line menu can jump to the newspaper's website by a single click on the link, learning the topic of the newspaper's recent edition. Alternatively, the cafeteria owner may put several advertising items in this region. The advertising items are tailored in accordance with the characteristics of the visitors to the web page.

In the large content editing area 2300, the owner adds a traffic tracking editing field 2370. As discussed in more detail below, to track the traffic to the web page, the owner has to plug a counter object into the field and the counter should be located between the word "the" and "visitor". To do so, the owner can click the "Object" link to the left, which brings up various predefined objects including different styles of counter objects for the owner to choose. In the text editing field 2350, the owner provides a brief introduction to this web page and a message about the direction to the cafeteria. A table is going to be inserted into this field to host the weekly menu (see, e.g., FIG. 3F). For those visitors who are not familiar with the cafeteria's location, a link may be attached to the word "link" at the end of the message in FIG. 3G so that they can seek help from a third-party service provider, e.g., Google Maps.

Note that the floppy disk icon 1600 in FIG. 3B has a different look from the one shown in FIG. 3A. This is because the screenshot is taken right after the owner finishes entering certain input and before the web page save module has a chance to transmit the input to the server computer. Once the new user input is transferred to and saved on the server side, the floppy disk icon 1600 will resume the look shown in FIG. 3A.

Figure 3C:
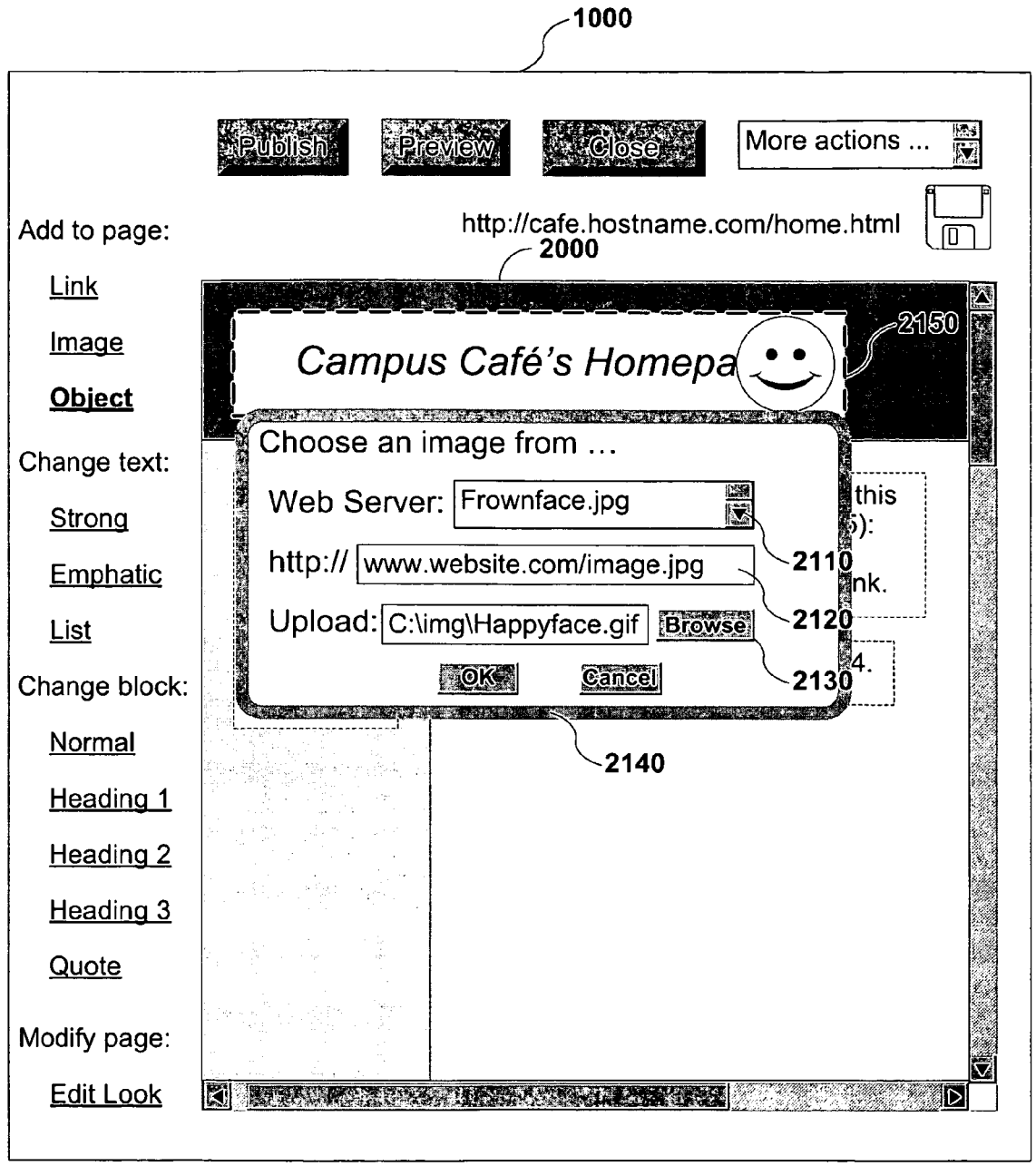

FIG. 3C illustrates how the cafeteria owner adds an image, e.g., the "Happy Face" to the web page, according to some embodiments. To do so, the owner selects the "Image" link to the left, notifying the web page editor that he is going to add an image to the web page. The web page editor, in response, inserts a user specified image at the location indicated by the user's cursor when the user selects the Image link.

Illustratively, the owner chooses the title editing field 2150 by clicking a mouse button on the right end of the field. The web page editor, in response, highlights the field's boundary by, e.g., making it wider or blinking, indicating that the title editing field is chosen to host the image. The web page editor brings up an image inserting dialog box 2140 for the owner to identify the source of the image. In this embodiment, the dialog box 2140 lists three potential sources for the image. For example, the owner may have pre-loaded a number of files (including images) into the server computer using the file upload module. He can choose one of them from the dropdown list 2110. Otherwise, the owner may identify the image by entering an image URL in the URL field 2120 or by browsing the file system of the local client computer to specify a file location 2130 of an image file to be uploaded to the server. In some embodiments, the image identified in the fields 2120 or 2130 automatically becomes a new member in the dropdown list 2110 after the image is inserted into the web page.

In the present embodiment, the owner chooses to upload the "Happy Face" image from the local client computer and hits the "OK" button in the image inserting dialog box 2140. As a result, the image appears in the title editing field 2150 at the location within that field previously specified by the owner (by clicking the mouse button while pointing to the location) and the image inserting dialog box 2140 disappears. Note that the owner can cancel the image inserting operation by clicking the "Cancel" button in the dialog box 2140 or by simply going back and re-clicking the "Image" link before clicking the "OK" button.

In some embodiments, if the owner clicks the mouse button at a location outside all existing editing fields, the web page editor creates a new instance of a structured field surrounding the position where the mouse button click occurs. The image is loaded into this newly created field in the same manner as discussed above.

Figure 3D:
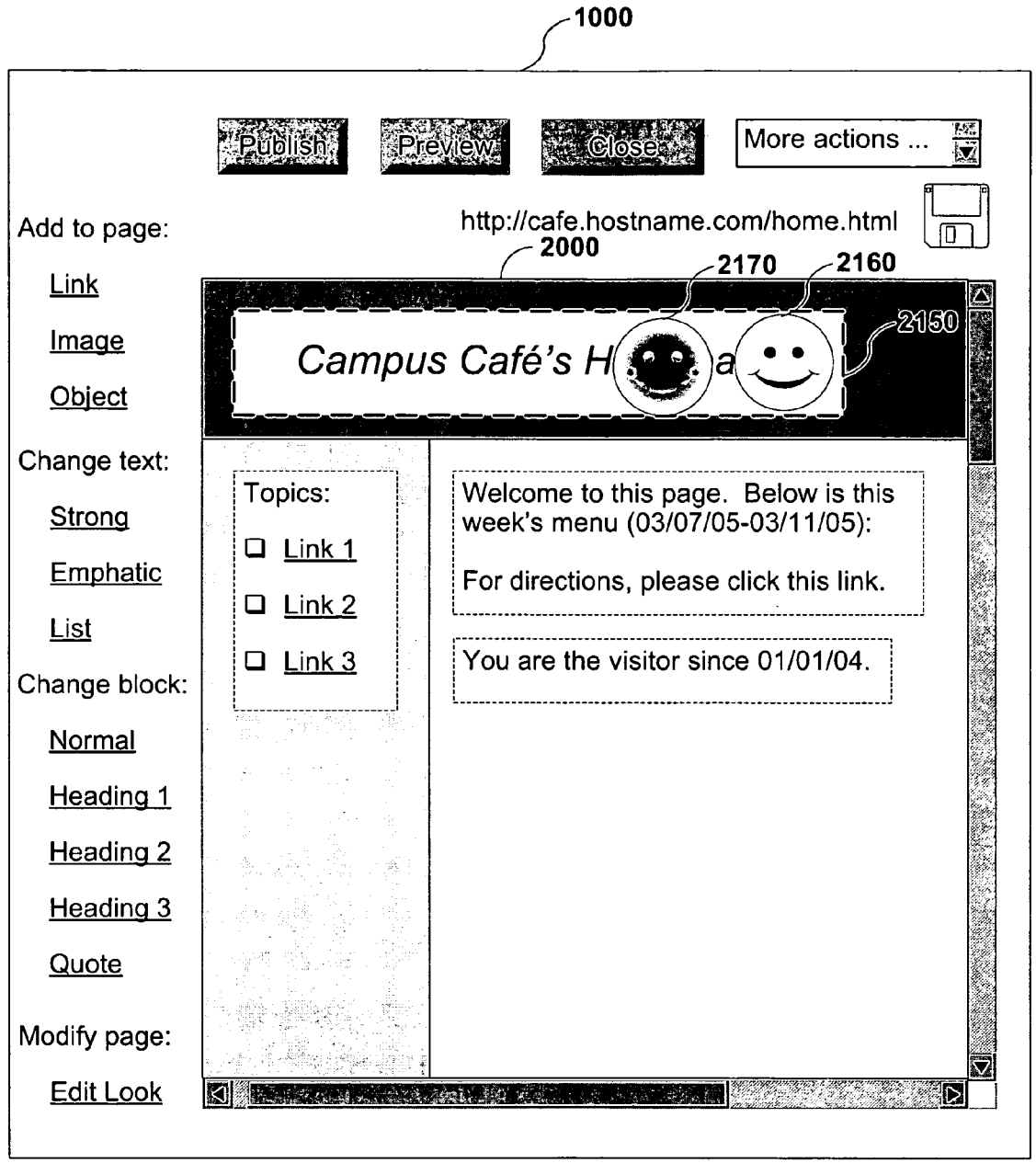

Sometimes, a web page author may not be satisfied with the initial chosen image location and would like to relocate the image to another location within the same or a different field. FIG. 3D is screenshot illustrating how the web page editor supports this image relocating operation. For illustrative purposes, the owner now decides to move the "Happy Face" image to the left of the web page title. In some embodiments, while a replica copy 2170 of the image is dragged towards the left by the mouse pointer, the original copy 2160 of the "Happy Face" image remains at its original location in the editing field 2150 to remind the owner of the current web page style. There is at least one visually distinct feature separating the two copies of the image, e.g., the replica copy 2170 may be configured to look more transparent than the original copy 2160.

In some embodiments, an image in a structured field can be in only one of three "position states:" 1) centered as its own paragraph (i.e., it is either above the first paragraph of text in the field, below the last paragraph of text in the field, or between two paragraphs of text); 2) floating left of a paragraph of text (i.e., the top edge of the image is at the same vertical position as the top of a particular paragraph in the field, and the left edge of the image is aligned with what would otherwise be the left margin of the paragraph of text); or 3) floating right of a paragraph (i.e., the top edge of the image is at the same vertical position as the top of a particular paragraph in the field, and the right edge of the image is aligned with what would otherwise be the right margin of the paragraph of text).

When a user selects (e.g., clicks on) an image in a structured field and begins dragging it, the original image remains in place while a translucent version of the image becomes draggable. The user can drag the translucent version of the image around the field freely. The opaque version of the image, however, snaps to new locations as the user drags it. In particular, the opaque version of the image snaps to the nearest position that conforms to the above position state rules. When the user stops dragging the image, the last position of the opaque version of the image becomes the new position of the image. Moreover, a user can insert or move multiple images to the same position state (e.g., the first position state) in the same "paragraph." As the user drags an image, the user can reorder it within a "paragraph" that has multiple images. The overall effect of this methodology of moving images is a highly intuitive experience that, while restrictive, generally gives users a desirable outcome for the positions of their images, while making it difficult to produce undesirable outcomes (i.e., web pages that appear badly composed).

Figure 3E:
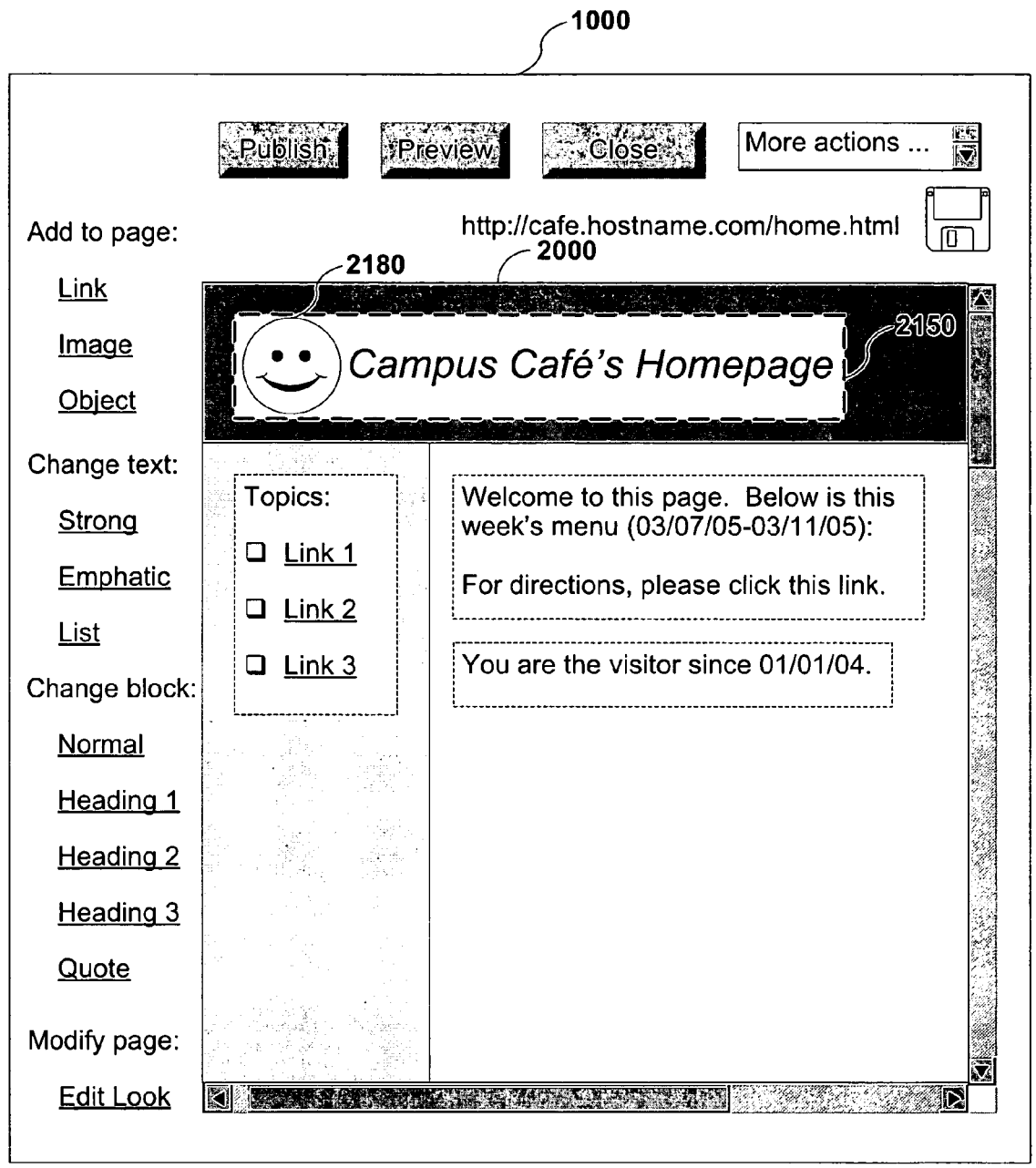

FIG. 3E illustrates how the web page looks like after the owner positions the "Happy Face" image 2180 at the left end of the title editing field 2150. Note that the web page editor automatically shifts the title in the field to the right to leave sufficient space for the image. In other words, the web page editor re-adjusts the layout of the remaining content objects in a field, be it a text paragraph or an image or both, in accordance with the movement of a relocated content object (e.g., an image). The owner can move the relocated content object into or out of a structured field or within the same structured field. If the content object moves out of the field, the remaining content objects are relocated accordingly to utilize the space left by removing the content object from the field. If the content object moves into the field, the other content objects are moved to set aside sufficient space for the incoming content object. The user input interpreter 252 (FIG. 2B), by monitoring movement of the mouse pointer and user keystrokes, enables the human-computer interactive web page composing and editing features and methods described here.

Figure 3F:
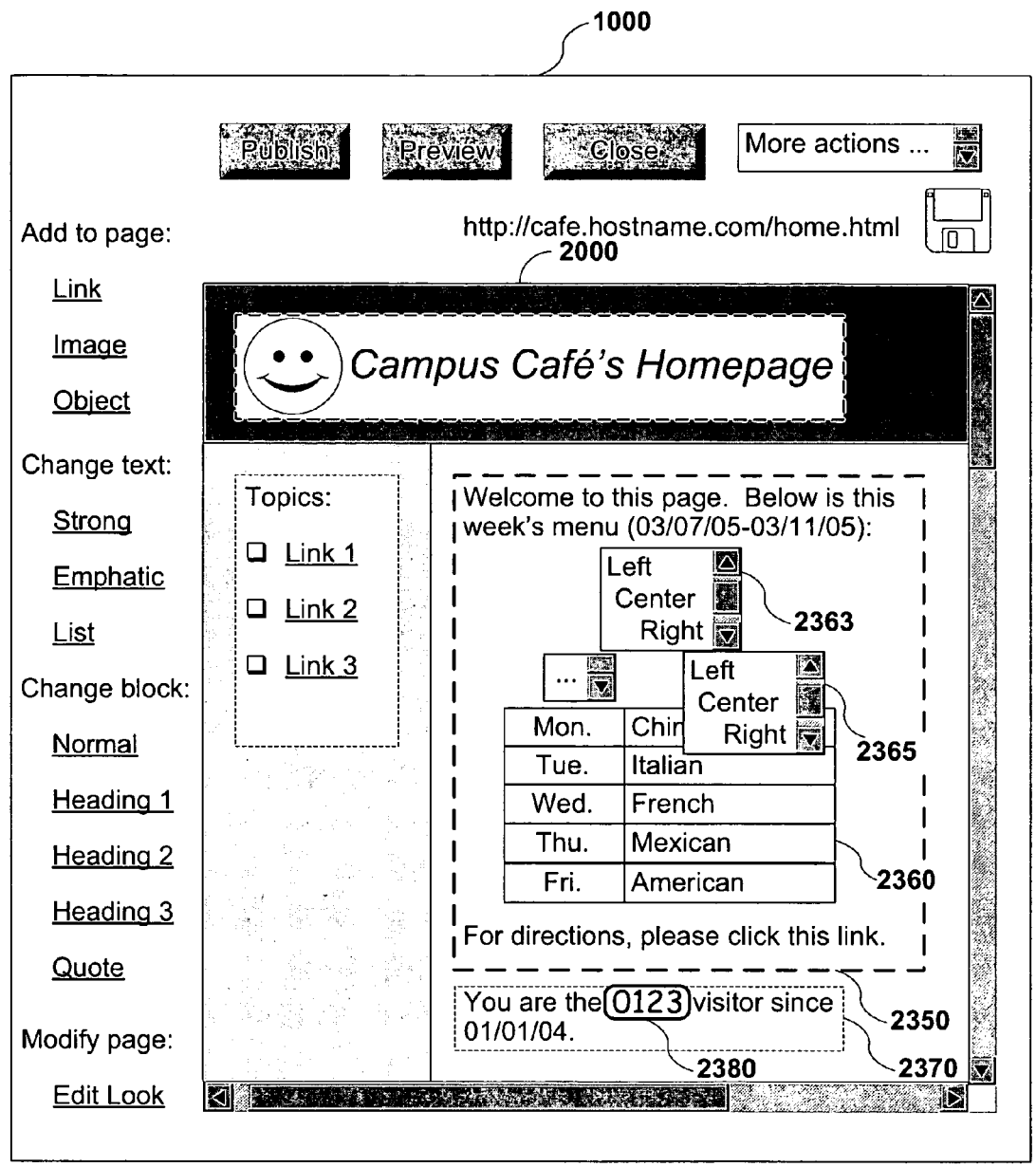

FIG. 3F is a screenshot illustrating the construction of a table in one of the structured fields. In this embodiment, table is a special type of object associated with the "Object" link to the left of the web page editing region. The cafeteria owner clicks the mouse button on a position within the editing field 2350 where the table is allocated. The web page editor inserts an initial, predefined table at the position indicated by the user's cursor. The user can then remove and insert rows and columns, at user specified locations with respect to the table, using graphical user interface (GUI) tools displayed with the table. Rows and columns can also be reordered using the displayed GUI tools.

In this example, the web page editor responds to the cafeteria owner's commands by creating a 5-row table 2360 in the middle of the editing field 2350, each row having two columns and hosting the lunch menu served at a particular weekday. Right above the table 2360 are a table-level control dropdown list 2363 and two column-level control dropdown lists 2365, one for each column of the table. The owner chooses a desired table alignment strategy, e.g., center-aligned, in the dropdown list 2363 and the web page editor adjusts the table 2360 accordingly. Using each column-level control dropdown list 2365, the owner can specify a text alignment strategy for each individual column. In this particular embodiment, the left column is set to be center-aligned and the right column is set to be left-aligned. In some embodiments, the web page editor may enable a set of row controls for each row of the table. Note that the use of the dropdown list for table controls is only for illustrative purposes. One skilled in the art may choose a different type of control mechanism to achieve the same or similar results.

Referring again to FIG. 3F, a counter object 2380 is plugged into the traffic tracking field 2370. In some embodiments, the counter 2380 is another special type of object that a web page author can choose by clicking the "Object" link to the left of the web page editing region. The counter tracks the number of visits to the web page since a particular date.

Figure 3G:
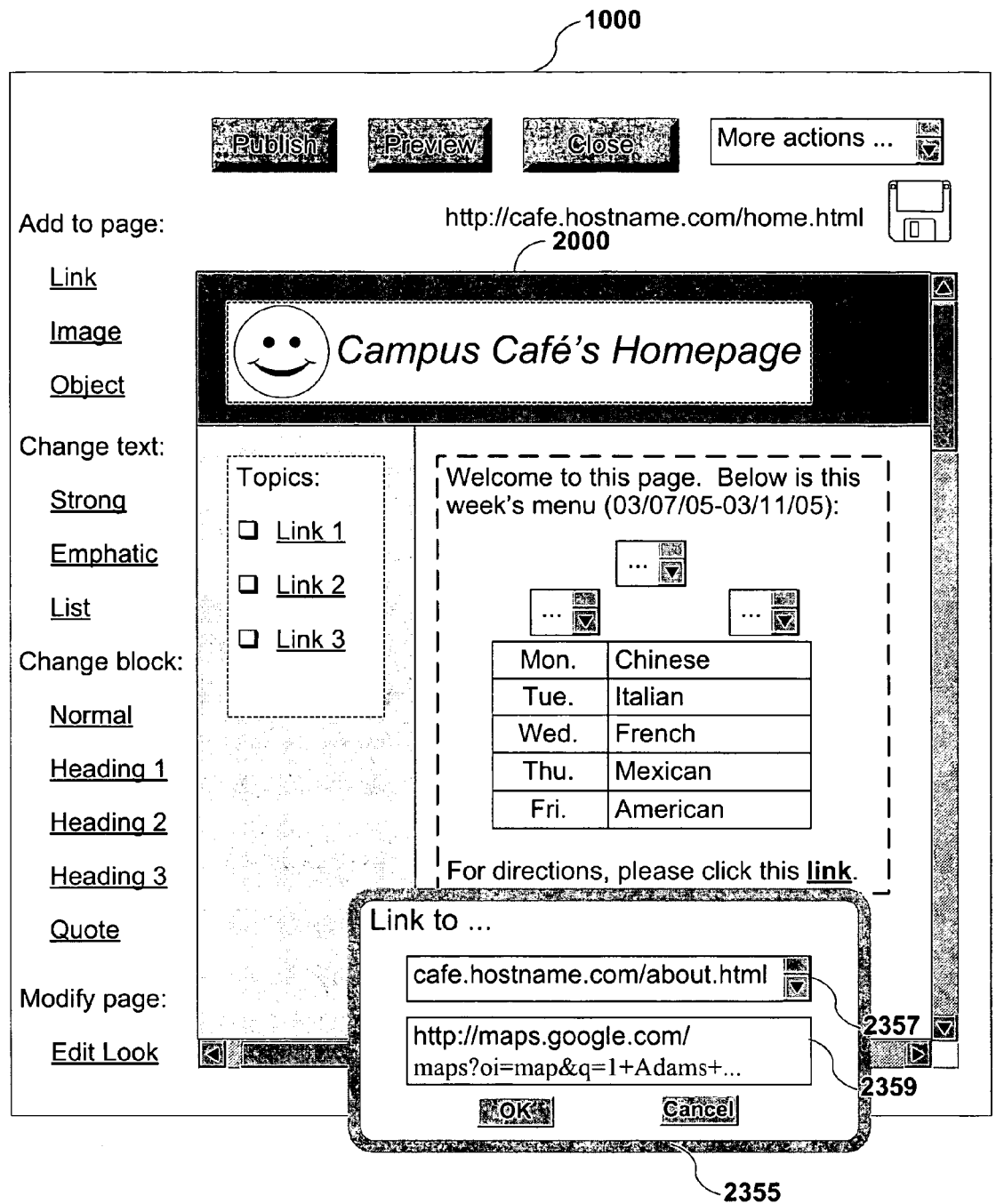

FIG. 3G is a screenshot illustrating how to associate a content object in the web page with a link to another web page or website. This operation is similar to the operation of inserting an image into the web page. The owner clicks the "Link" link to the left of the web page editing region 2000 to notify the web page editor that it should bring up a dialog box. If text is selected when the link command is selected, that text is transformed into a link.

As shown in FIG. 3G, the linking dialog box 2355 pops up near the user-selected content object, the word "link". The linking dialog box 2355 provides two potential sources for the link. The dropdown list 2357 includes other web pages composed by the owner, which may be associated with the web page under construction. For example, the on-line menu web page may be one of many web pages in a personal website constructed by the cafeteria owner. In this example, the other web pages associated with the website are listed in the drop-down list 2357. Alternatively, the cafeteria owner may enter a URL (in a second editable box 2359). For instance, the URL entered by the owner in box 2359 may point to another website or web page that offers a service that the owner deems useful to his on-line menu. In the example shown in FIG. 3G, the owner establishes a link to Google's mapping service, http:/maps.google.com/maps?oi=map&q=1+Adams+ Street,+Boston, +MA. Using this link, a new customer to the cafeteria is led to a map showing the location of the Campus Café (which, in this example, is the fictional address 1 Adams Street, Boston, Mass.).

Figure 3H:
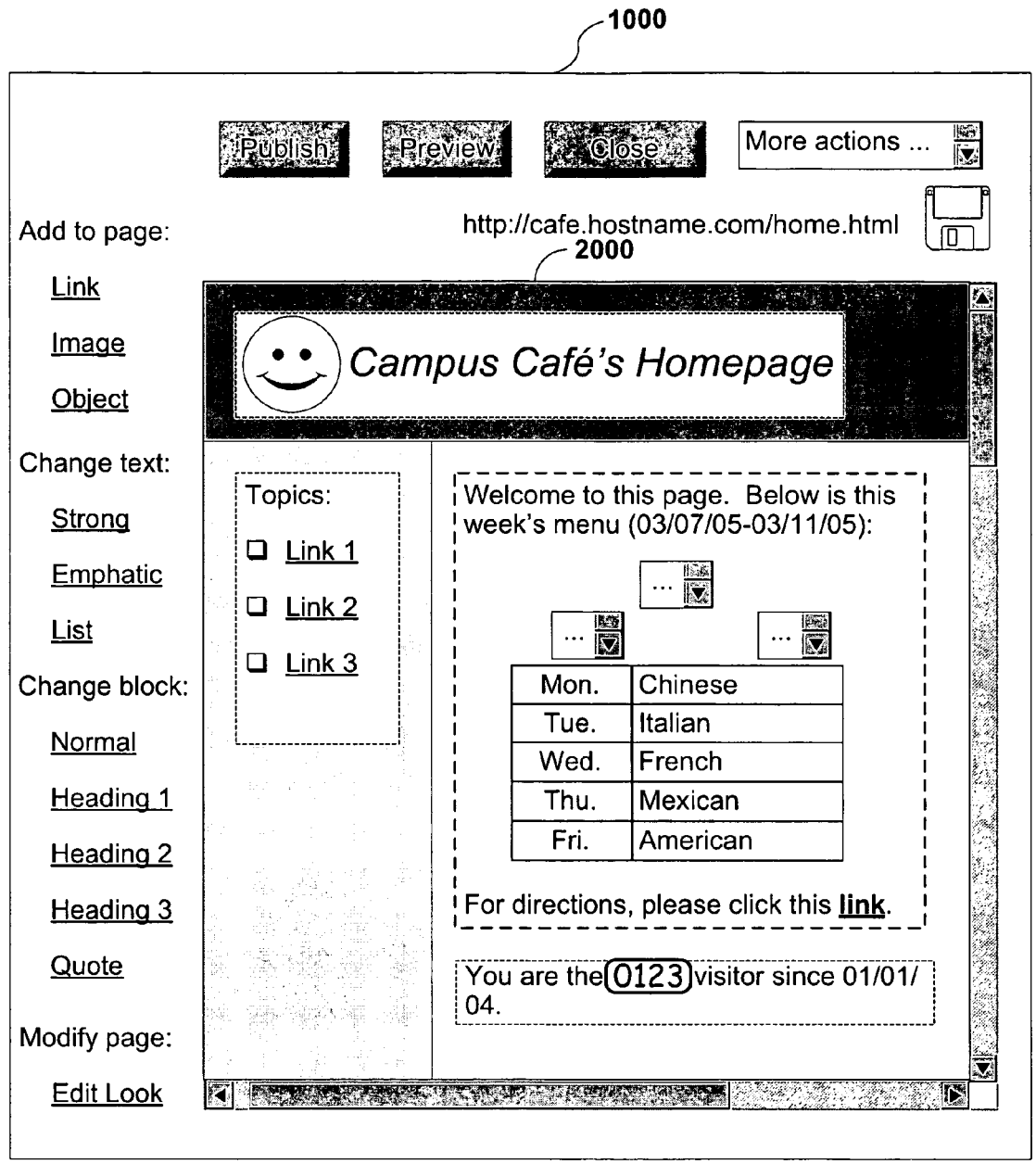
Figure 3I:
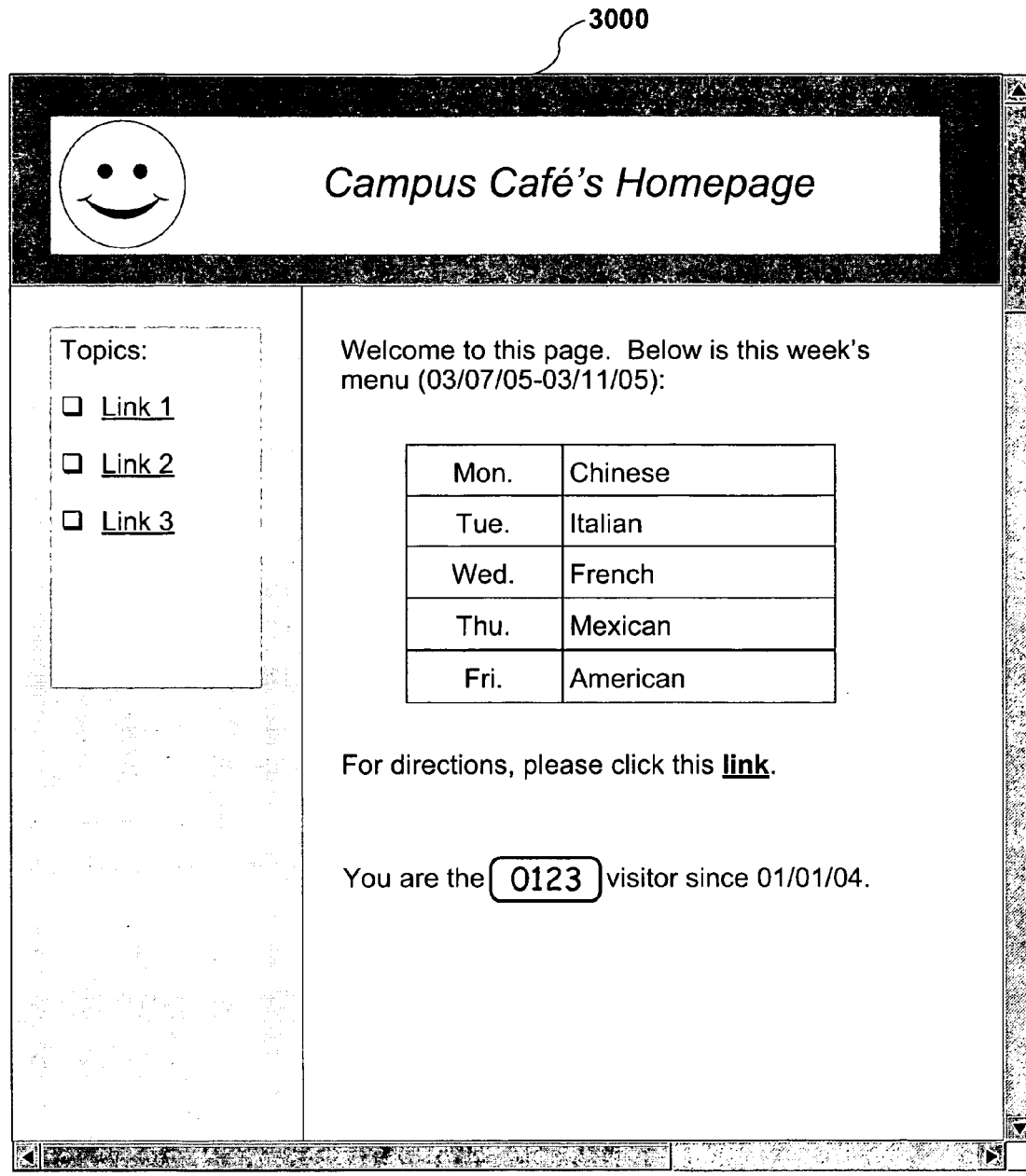

FIG. 3H is a screenshot of the authoring web page right before publication of the newly composed web page on the Internet. FIG. 3I is a screenshot of the same web page rendered in a separate browser window 3000 after its publication. The web page has an almost identical look-and-feel as it had when displayed in the web page editing region 2000 in FIG. 3H. The only noticeable difference is that the dashed line boundaries associated with the editing fields and the table control dropdown lists are not shown in the published web page. Other than that, all the content objects in the published web page are rendered in the browser window 3000 in a WYSIWYG manner.

In a client computer, the various content objects of a web page entered by a web page author typically exist in the form of an HTML file and its associated resource files (e.g., image files), because the web page is rendered from an HTML file.

In the server computer, as mentioned above, the various content objects of a web page are organized into a set of (key, value) pairs, each key identifying a structured field in the web page and each corresponding value identifying the web page content appearing in the structured field. In some embodiments, the (key, value) pairs of a web page can also specify characteristics of a field or its content, such as a font or font characteristic (e.g., italic, or bold), or image size, or the like. For instance, font characteristics for content in a field are indicated using HTML tags within the value of the (key, value) pair for that field. Thus, the value in a key-value pair may be or include HTML encoded text. In some embodiments, when the server computer receives one or more key-value pairs for a composed page, the server filters the key-value pairs to remove one or more predefined classes of content. For instance, the server may remove all JavaScript or ECMAScript, if any, from the values of the received key-value pairs before those key-value pairs are durably stored. In this example, content is removed from the key-value pairs in order to avoid potential security or privacy breaches. In other examples, content may be removed from the key-value pairs in order to further other goals or to implement predefined policies.

Besides the (key, value) pairs, the web page has an associated web template that includes information defining the look-and-feel of the web page. In some embodiments, the server computer stores a number of predefined web templates in its storage device, each identified by a unique template ID. Before entering any content into a web page editing region, the web page author chooses one of the web templates that he sees fit for the web page. At the end of the web page construction, the server computer associates a set of (key, value) pairs with a particular template ID referencing the web template chosen by the web page author. If the web page author does not like a previously chosen web template, he can replace it with another one using the "Edit Look" link. The web page author may design his own web template if none of the predefined web templates satisfies his needs.

Figure 4:
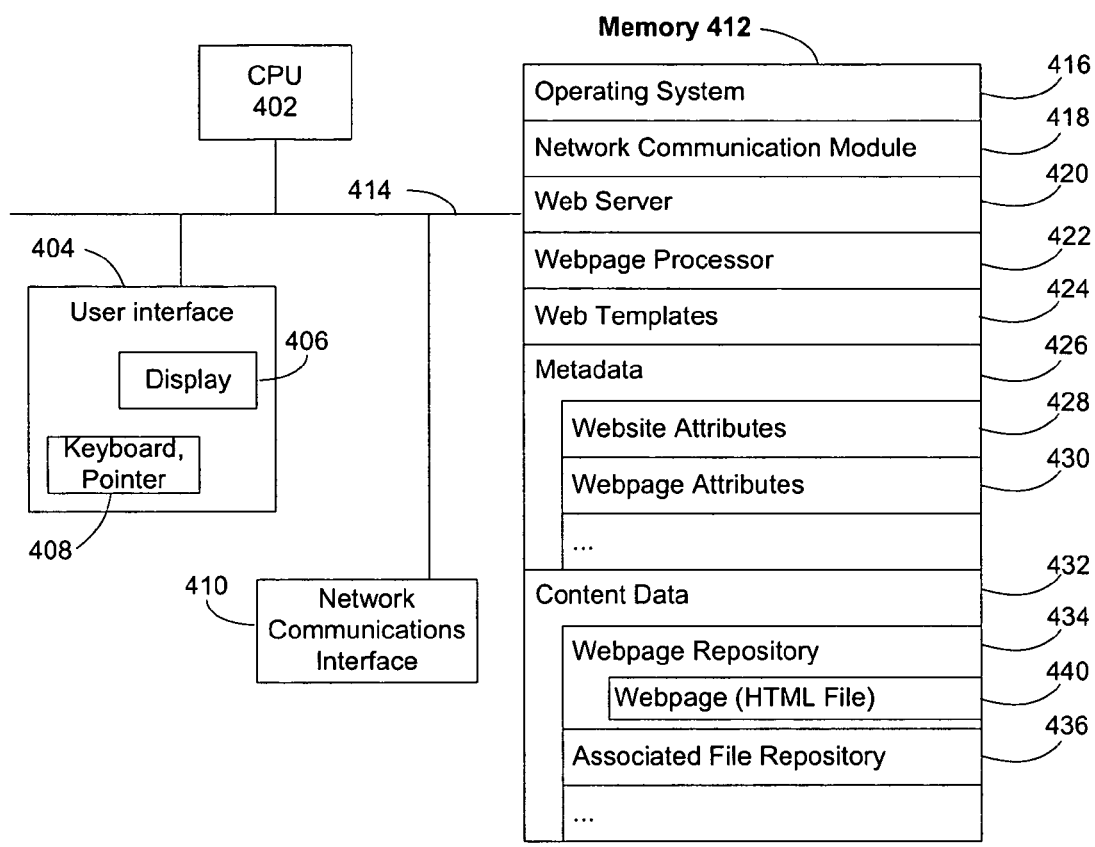
FIG. 4 is a block diagram of a server computer in accordance with some embodiments of the present invention.

FIG. 4 is a block diagram illustrating the structure of a server computer 400 in accordance with some embodiments of the present invention. Like the client computer 200, the server computer 400 also includes one or more processing units (CPUs) 402, one or more network or other communications interfaces 410, memory 412, and one or more communication buses 414 for interconnecting these components. The server computer 400 optionally includes a user interface 404 that comprises a display device 406 and a keyboard and/or pointer device 408. The memory 412 includes high speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 412 may optionally include one or more storage devices remotely located from the CPUs 402. In some embodiments, the memory 412 stores the following elements, modules and data structures, or a subset or superset thereof:

an operating system 416 that includes procedures for handling various basic system services and for performing hardware dependent tasks;

a network communication module (or instructions) 418 for connecting the server computer 400 to other computers via the one or more network communications interfaces 410 (through wired or wireless connections), using the Internet, other wide area networks, local area networks, metropolitan area networks, or the like;

a web server module (or instructions) 420 for handling user access requests for web pages from different client computers, including receiving a user's access request for a web page, verifying the existence of the web page and the user's access privilege to the web page, identifying or dynamically generating an HTML file corresponding to the web page and transmitting the HTML file to a requesting client computer;

a web page processor module (or instructions) 422 for dynamically generating an HTML file 440 corresponding to a user-requested web page using its associated set of (key, value) pairs and web template;

one or more system-defined or user-defined web templates 424, each web template corresponding to a specific look-and-feel design for a web page;

metadata 426, the metadata further including one or more website attributes 428, one or more web page attributes 430, etc.; and content data 432, the content data 432 further including a web page repository 434 hosting a plurality of web pages 440 and an associated file repository 436 hosting files (e.g., images) referenced by the web pages.

Figure 5:
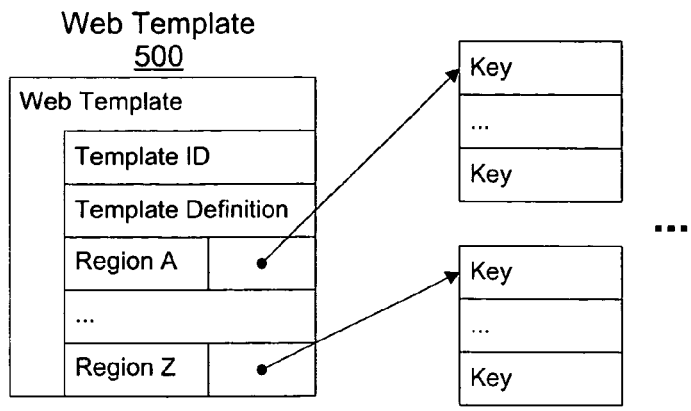
FIG. 5 is a block diagram illustrating the data structure of a web template according to some embodiments of the present invention.
Figure 6:
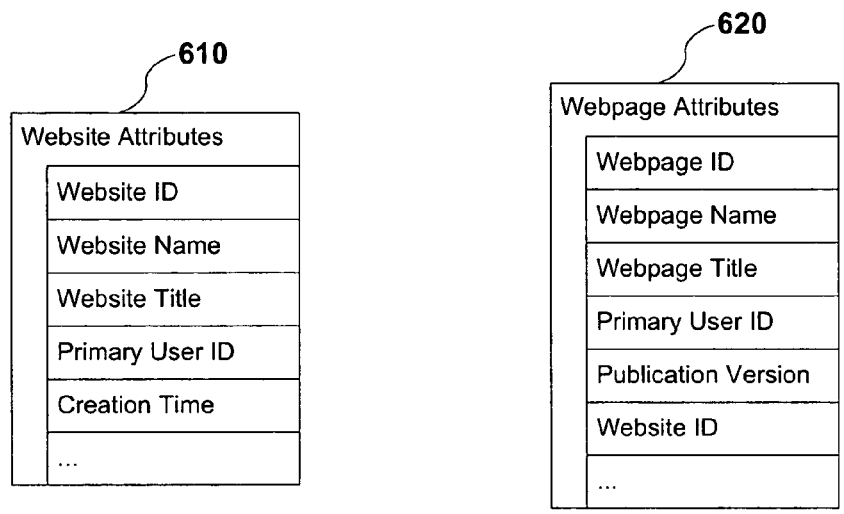
FIG. 6 depicts two block diagrams illustrating typical attributes used for characterizing a website and a web page, respectively, according to some embodiments of the present invention.
Figure 7:
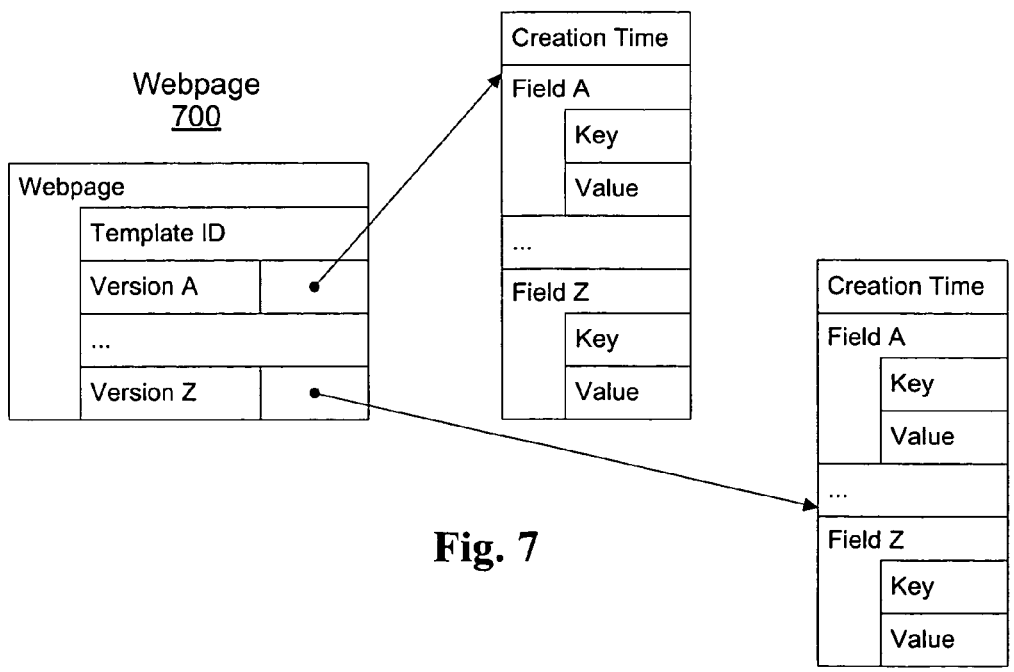
FIG. 7 is a block diagram illustrating the data structure of a web page according to some embodiments of the present invention.

FIGS. 5-7 are block diagrams illustrating data structures used for hosting the various types of data mentioned above in accordance with some embodiments of the present invention.

FIG. 5 is a block diagram illustrating the data structure of a web template 500. The web template includes a template ID that uniquely identifies the web template and a template definition that partitions a browser window into a plurality of regions, each region corresponding to zero or more keys. The keys are assigned to a specific location in specific region of the web template. When the web template is referenced by a particular web page, corresponding values are inserted into different regions and the web template is converted into a web page. It may be noted that keys associated with the template regions are also associated with the structured fields inserted into these template regions when reconstructing the web page.

As mentioned above, a website typically includes many web pages, each one covering a specific topic related to the website. FIG. 6 shows a block diagram 610 illustrating typical attributes used for characterizing a website. These attributes include:

- website ID, which uniquely identifies the website within the server computer;
- website name, which can be a user-provided character string defining the website's URL;
- website title, which can be a user-provided character string indicating the general topic of the website;
- primary user ID, which identifies a web page author who is primarily responsible for authoring the web pages associated with the website, e.g., the creator of the website; and
- creation time of the website.

Each website includes one or more web pages. To uniquely identify a web page associated with a website, the web page is assigned a set of web page attributes 620 such as:

- web page ID, which uniquely identifies the web page within a website;
- web page name, which can be a user-provided character string defining the web page's URL;
- web page title, which can be a user-provided character string indicating the topic of the web page;
- primary user ID, which identifies a web page author who is primarily responsible for authoring the web page;
- publication version, which identifies the version of the web page that has been released to the public or a designated group of visitors; and
- website ID, which identifies the website with which the web page is associated.

In some embodiments, the server computer maintains multiple versions of a web page that have been composed at different dates. One benefit inherent in this storage strategy is that a web page author is able to refer to an old version for reference purposes while composing a new version. This storage strategy also allows the web page or website's owner or administrator to specify that the published version of the web page is a version other than the latest version composed (or in the process of being composed) by the web page author. In one embodiment, the server computer maintains every version of a composed web page, using delta compression (also called differential encoding) or other techniques to efficiently represent the differences between versions and to enable the reconstruction of any selected version in a sequence of versions of the composed web page.

When the web page processor 422 receives a request for a web page, it identifies its publication version in the set of web page attributes 620 and then retrieves from a server-side database a set of (key, value) pairs corresponding to the publication version and an associated web template. Using this retrieved information, the web page processor dynamically generates an HTML file for the requested web page and passes the HTML file to the web server 420. The HTML file is then transmitted back to a client computer and rendered therein. In some embodiments, since the requested version is the published version, the web page processor 422 does not examine the privilege of the requesting user to determine whether to transmit the web page authoring tool to the client computer. In some embodiments, the HTML file is transmitted to the requesting user as it is generated by the web page processor 422, and the web server 420 does not store a copy of the HTML file. However, in some such embodiments, copies of the HTML files for web pages that have high request rates may be stored in a cache in order to avoid reconstructing those web pages having high request rates. A web page having a high request rate may defined as a web page having more than a threshold number of requests per predefined time period, or having an average number of requests per predefined time period that exceeds a particular threshold.

FIG. 7 is a block diagram illustrating the data structure of a web page 700. The web page includes a template ID that uniquely identifies the web template that specifies the web page's look-and-feel. Note that the web page includes multiple versions, each version corresponding to a set of (key, value) pairs created at a particular date. The web page author can arbitrarily specify any one of the multiple versions to be the publication version and update the web page attributes 620 accordingly. FIG. 7 is a conceptual diagram. In one embodiments, the actual data stored for successive versions is compressed, for instance using delta compression, so that the system stores the differences between versions instead of complete copies of each version of the web page.

Each of the above identified modules or programs corresponds to a set of instructions for performing one or more functions described above. These modules and programs (i.e., sets of instructions) need not be implemented as separate software programs, procedures or modules, and thus various subsets of these modules may be combined or otherwise re-arranged in various embodiments. In some embodiments, the memory may store a subset of the modules and data structures identified above. Furthermore, the memory may store additional modules and data structures not described above.

In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement an server system and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A method for composing a user defined web page, comprising:
    at a client, using a web browser executed at the client:
        displaying in a first browser window an authoring web page, including displaying a graphical user interface of an authoring tool that is embedded in the authoring web page; the displayed graphical user interface for composing the user defined web page;
        using the displayed graphical user interface of the authoring tool to receive user instructions, and responding to the user instructions by placing instances of predefined structured fields in the user defined web page and associating user specified content with the instances of the predefined structured fields, wherein a respective instance of the predefined structured fields in the user-defined web page corresponds to a geometric region of the user-defined web page having a visible and adjustable boundary;
        displaying a preview of the user defined web page in a second web browser window; and sending the user defined web page to a server for public access.

2. The method of claim 1, further comprising:
allowing the user to select a content object within an instance of a predefined structured field;
displaying a dialog box near the content object, the dialog box including information related to the content object; and
allowing the user to modify the content object by updating the information in the dialog box.

3. The method of claim 2 further comprising allowing the user to enter a source location for a respective candidate image of a list of candidate images in the dialog box for display in the instance of a predefined structured field.

4. The method of claim 1, further comprising:
allowing the user to move a content object from a source location to a destination location; and
adjusting other content near the source and destination locations to accommodate the movement of the content object.

5. The method of claim 4, including continuing to display the content object at the source location while displaying a replica of the content object being moved towards the destination location.

6. The method of claim 1, further comprising:
saving the user-defined web page in accordance with a predefined schedule; and
providing to the user an indicator in the first web browser window indicating whether the user-defined web page includes any changes that have not been saved.

7. The method of claim 1, wherein the user instructions are provided by a first user, the method further comprising:
notifying the first user that the user-defined web page is currently being composed by a second user when the first user attempts to open the user-defined web page;
allowing the first user to deprive the second user of the right to compose the user-defined web page;
notifying the second user that the first user is composing the user-defined web page; and
providing a mechanism for the second user to recover the user-defined web page as composed by the second user.

8. The method of claim 1, wherein at least one instance of a predefined structured field includes a heuristic instruction suggesting a type of content suitable for adding to the at least one instance of a predefined structured field.

9. The method of claim 1, wherein the first web browser window includes a mechanism allowing the user to trigger the displaying of the user-defined web page in the second web browser window.

10. The method of claim 1, wherein the user-defined web page displayed in the second web browser window is non-editable.

11. The method of claim 1, wherein the user-defined web page displayed in the second web browser window is an HTML file.

12. A computer readable storage medium storing one or more programs for execution by a computer, the one or more programs, including a web browser-based web page authoring tool, comprising:
a web page editor embedded in an authoring web page, the authoring web page suitable for display by a web browser; and
the web page editor including a web server communication interface for communication with a remote server;
wherein the web page editor includes instructions for:
displaying a graphical user interface of the web page editor;
updating a user defined web page displayed in a first web browser window of the web browser in accordance with user inputs received using the graphical user interface;
defining multiple user-specified fields in the first web browser window of the web browser each of a plurality of the user-specified fields having a visible and adjustable boundary;
saving the user inputs to the remote server through the web server communication interface; and
displaying a preview of the user defined web page in a second web browser window of the web browser in a manner consistent with the user defined web page displayed in the first web browser window of the web browser in response to a user instruction.

13. The computer readable storage medium of claim 12, wherein the web page editor includes instructions for:
allowing the user to select a content object within a user-specified instance of a structured field;
displaying a dialog box near the content object, the dialog box including information related to the content object; and
allowing the user to modify the content object by updating the information in the dialog box.

14. The computer readable storage medium of claim 13, wherein, if the content object is an image, the dialog box lists at least one candidate image for display in a user-specified instance of a structured field.

15. The computer readable storage medium of claim 14, wherein the web page editor includes instructions for allowing the user to enter a source location for a respective candidate image in the dialog box.

16. The computer readable storage medium of claim 12, wherein the web page editor includes instructions for:
allowing the user to move a content object from a source location to a destination location in the web page; and
adjusting other content near the source and destination locations to accommodate the movement of the content object.

17. The computer readable storage medium of claim 16, wherein the source and destination locations are within a single user-specified instance of a structured field.

18. The computer readable storage medium of claim 16, wherein the web page editor includes instructions for continuing to display the content object at the source location while displaying a replica of the content object being moved towards the destination location.

19. The computer readable storage medium of claim 12, wherein the web page editor includes instructions for:
saving the web page in accordance with a predefined schedule; and
providing to the user an indicator in the first web browser window indicating whether the web page includes any changes that have not been saved.

20. The computer readable storage medium of claim 12, wherein the web page displayed in the second web browser window is non-editable.

21. A client system comprising:
one or more processors;
memory storing one or more programs to be executed by the one or more processors, the one or more programs including a browser application; and
an authoring web page stored in the memory, the authoring web page comprising:
an authoring tool embedded in the authoring web page, the authoring tool including a graphical user interface for composing a user-defined web page;

instructions for displaying in a first browser window the authoring web page including the graphical user interface of the authoring tool;

instructions for using the displayed graphical user interface of the authoring tool, responding to user instructions by placing instances of predefined structured fields in the user-defined web page and associating user-specified content with the instances of the predefined structured fields, wherein a respective instance of the predefined structured fields in the user-defined web page corresponds to a geometric region of the user-defined web page having a visible and adjustable boundary;

instructions for displaying a preview of the user-defined web page in a second browser window; and instructions for sending the user-defined web page to a server for publication.

22. The client system of claim 21, wherein the authoring web page includes instructions for:

allowing the user to select a content object within an instance of a predefined structured field;

displaying a dialog box near the content object, the dialog box including information related to the content object; and allowing the user to modify the content object by updating the information in the dialog box.

23. The client system of claim 22, wherein, if the content object is an image, the dialog box lists at least one candidate image for display in an instance of a predefined structured field.

24. The client system of claim 23, wherein the authoring web page includes instructions for allowing the user to enter a source location for a respective candidate image in the dialog box.

25. The client system of claim 21, further comprising instructions for:

notifying a first user that the user-defined web page is currently being composed by a second user when the first user attempts to open the user-defined web page;

allowing the first user to deprive the second user of the right to compose the user-defined web page;

notifying the second user that the first user is composing the user-defined web page; and providing a mechanism for the second user to recover the user-defined web page as composed by the second user.

26. The client system of claim 21, wherein at least one instance of a predefined structured field includes a heuristic instruction suggesting a type of content suitable for adding to the instance of a predefined structured field.

27. A server system comprising:

one or more processors; and memory storing an authoring web page and one or more programs to be executed by the one or more processors, the one or more programs including instructions for providing the authoring web page to a client;

the authoring web page comprising:

an authoring tool embedded in the authoring web page, the authoring tool including a graphical user interface for composing a user-defined web page;

instructions for displaying in a first browser window at the client, the authoring web page including the graphical user interface of the authoring tool;

instructions for using the displayed graphical user interface of the authoring tool, responding to user instructions by placing instances of predefined structured fields in the user-defined web page and associating user-specified content with the instances of the predefined structured fields, wherein a respective instance of the predefined structured fields in the user-defined web page corresponds to a geometric region of the user-defined web page having a visible and adjustable boundary;

instructions for displaying a preview of the user-defined web page in a second browser window at the client; and instructions for sending the user-defined web page to the server for publication.

28. The server system of claim 27, the authoring web page further comprising instructions for:

identifying a content object selected by a user within an instance of a predefined structured field;

displaying a dialog box near the content object, the dialog box including information related to the content object; and displaying a modified content object by updating the information in the dialog box.

29. The server system of claim 27, wherein at least one instance of a predefined structured field includes a heuristic instruction suggesting a type of content suitable for adding to the instance of a predefined structured field.

30. A computer readable storage medium storing one or more programs for execution by a computer, the one or more programs, including a web browser-based web page authoring tool, comprising:

a web page editor embedded in an authoring web page, the authoring web page suitable for display by a web browser; and the web page editor including a web server communication interface for communication with a remote server;

wherein the web page editor includes instructions for:

displaying a graphical user interface of the web page editor;

updating a user defined web page displayed in a first web browser window of the web browser in accordance with user inputs received using the graphical user interface;

saving the user inputs to the remote server through the web server communication interface; and displaying a preview of the user defined web page in a second web browser window of the web browser in a manner consistent with the user defined web page displayed in the first web browser window of the web browser in response to a user instruction;

wherein the web page editor includes instructions for displaying the boundary of a user-specified instance of a structured field whose content is being edited by the user in a visually distinct manner compared with a user-specified instance of a structured field whose content is not being edited by the user.

* * * * *